US011886416B2

(12) United States Patent
Ghate et al.

(10) Patent No.: US 11,886,416 B2
(45) Date of Patent: Jan. 30, 2024

(54) SYSTEM, METHOD, AND COMPUTER PROGRAM PRODUCT FOR RECONFIGURING A DATA TABLE FOR PROCESSING ON A SERVER CLUSTER

(71) Applicant: Visa International Service Association, San Francisco, CA (US)

(72) Inventors: Nikhil Jayant Ghate, Fremont, CA (US); Mohit Umesh Kudalkar, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 23 days.

(21) Appl. No.: 17/565,606

(22) Filed: Dec. 30, 2021

(65) Prior Publication Data
US 2023/0214372 A1    Jul. 6, 2023

(51) Int. Cl.
G06F 16/22 (2019.01)
G06F 16/28 (2019.01)

(52) U.S. Cl.
CPC ........ G06F 16/2282 (2019.01); G06F 16/221 (2019.01); G06F 16/285 (2019.01)

(58) Field of Classification Search
CPC ... G06F 16/2282; G06F 16/221; G06F 16/285
See application file for complete search history.

(56) References Cited

U.S. PATENT DOCUMENTS

| | | | |
|---|---|---|---|
| 9,355,127 B2 | 5/2016 | Gaza et al. | |
| 10,303,654 B2 * | 5/2019 | Sun | G06F 16/278 |
| 2010/0114870 A1 * | 5/2010 | Al-Omari | G06F 16/24532 |
| | | | 707/E17.14 |
| 2014/0108459 A1 * | 4/2014 | Gaza | G06F 16/278 |
| | | | 707/792 |
| 2015/0261840 A1 * | 9/2015 | Clifford | G06F 16/951 |
| | | | 707/807 |
| 2017/0097957 A1 * | 4/2017 | Bourbonnais | G06F 16/24554 |
| 2018/0012391 A1 * | 1/2018 | Han | G06T 13/80 |
| 2019/0370372 A1 * | 12/2019 | Lam | G06F 16/2282 |

OTHER PUBLICATIONS

Sindhuja et al., "Transformation of Data from RDBMS to HDFS by using Load Atomizer", IJISET—International Journal of Innovative Science, Engineering & Technology, 2016, pp. 35-43, vol. 3:10.

* cited by examiner

Primary Examiner — Dangelino N Gortayo
(74) Attorney, Agent, or Firm — The Webb Law Firm

(57) ABSTRACT

Described are a system, method, and computer program product for reconfiguring a data table for processing on a server cluster. The method includes extracting a data table from a relational database and determining whether the data table includes a column having a range of values with a uniform distribution. The method also includes, in response to determining that the data table includes the column, classifying the column as a candidate column for splitting the data table. The method further includes, in response to determining that the data table does not include the column, inserting an index column into the data table and classifying the index column as the candidate column. The method further includes splitting the data table based on the candidate column and distributing each subdivision to a node of the server cluster so as to cause the server cluster to collectively process the data table.

17 Claims, 8 Drawing Sheets

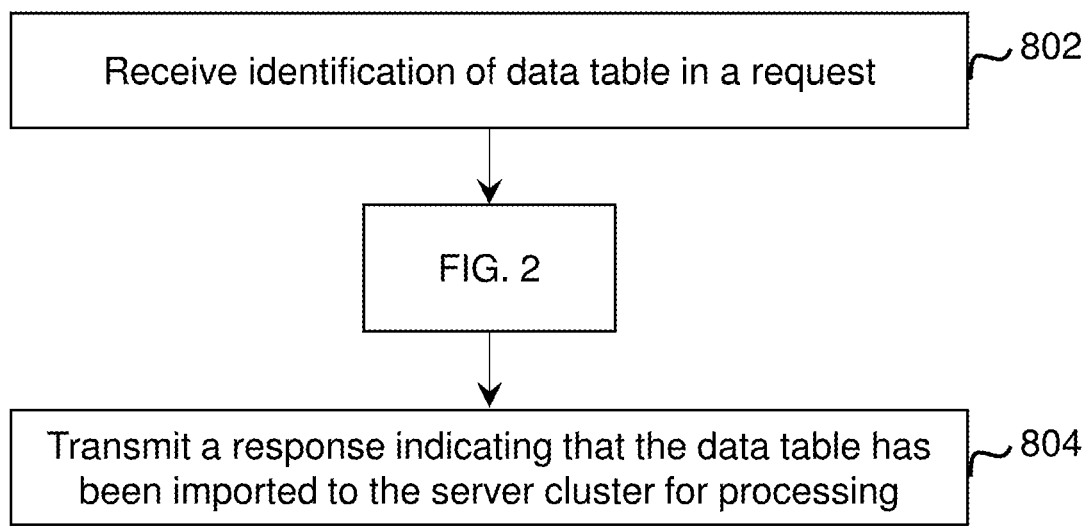

SYSTEM, METHOD, AND COMPUTER PROGRAM PRODUCT FOR RECONFIGURING A DATA TABLE FOR PROCESSING ON A SERVER CLUSTER

BACKGROUND

1. Technical Field

This disclosure relates generally to distributed data processing and, in non-limiting embodiments or aspects, to systems, methods, and computer program products for reconfiguring a data table for processing on a server cluster.

2. Technical Considerations

Data may be imported (e.g., transferred) from a relational database to a distributed server system (e.g., a server cluster) for processing. In some cases, the data may be divided in a manner that allows the system to process the data in parallel across a series of server nodes. Parallel processing allows multiple processors to run a program in less time.

Because the parallelism is directly tied to the underlying data, issues may arise when the data is heavily skewed. For instance, division of the heavily skewed data may result in a small number of processors out of a large processor pool receiving and processing most of the data. The small number of processors become overburdened while other processors sit idle, resulting in longer run times, memory issues leading to failures, and skewed output data files.

There is a need in the art for an improved system for reconfiguring a data table for processing on a server cluster, which addresses the foregoing technical issues with distributed, parallel processing.

SUMMARY

According to some non-limiting embodiments or aspects, provided is a system, method, and computer program product for reconfiguring a data table for processing on a server cluster.

According to some non-limiting embodiments or aspects, provided is a system for reconfiguring a data table for processing on a server cluster. The system includes a server including at least one processor, and the server is programmed or configured to extract a data table from a relational database based on an identification of the data table. The server is further programmed or configured to determine whether the data table includes at least one column having a range of values with a uniform distribution by identifying a set of columns previously evaluated and used to split data for distributed processing and determining whether the set of columns includes one or more columns of the data table that were previously determined to uniformly split the data table. The server is further programmed or configured to, in response to determining that the data table includes the at least one column, classify the at least one column as a candidate column for splitting the data table. The server is further programmed or configured to, in response to determining that the data table does not include the at least one column: insert an index column into the data table; and classify the index column as the candidate column for splitting the data table. The server is further programmed or configured to split the data table based on the candidate column to generate a plurality of subdivisions of the data table, wherein a number of the plurality of subdivisions is equal to a number of a plurality of nodes in a server cluster, and wherein the plurality of subdivisions are generated based on subranges of values in a range of values in the candidate column. The server is further programmed or configured to distribute each of the plurality of subdivisions to a node of the plurality of nodes of the server cluster so as to cause the server cluster to collectively process the data table.

In some non-limiting embodiments or aspects, the server may be further programmed or configured to remove the index column from the data table after the data table is split and before the plurality of subdivisions are distributed to the server cluster for processing.

In some non-limiting embodiments or aspects, the server may be further programmed or configured to identify an existing column of the data table not previously used to split the data table. The server may be further programmed or configured to evaluate a uniformity of a split of the data table based on the existing column. The server may be further programmed or configured to, in response to determining that the existing column can be used to split the data table uniformly, add the existing column to the set of columns and classify the existing column as capable of being used to uniformly split the data table.

In some non-limiting embodiments or aspects, splitting the data table based on the candidate column may further include: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

In some non-limiting embodiments or aspects, the server may be further programmed or configured to receive, from a user interface, the identification of the data table in a request to import the data table to the server cluster for processing. The server may be further programmed or configured to transmit, to the user interface, a response indicating that the data table has been imported to the server cluster for processing.

In some non-limiting embodiments or aspects, the server may be further programmed or configured to, in response to determining that the data table includes the at least one column: evaluate a uniformity of a split of the data table based on using the at least one column as the candidate column. The server may be further programmed or configured to, in response to determining that using the at least one column as the candidate column does not split the data table uniformly, modify the set of columns to classify the at least one column as not able to uniformly split the data table.

According to some non-limiting embodiments or aspects, provided is a computer-implemented method for reconfiguring a data table for processing on a server cluster. The method includes extracting, with at least one processor, a data table from a relational database based on an identification of the data table. The method also includes determining, with at least one processor, whether the data table includes at least one column having a range of values with a uniform distribution by identifying a set of columns previously evaluated and used to split data for distributed processing, and determining whether the set of columns includes one or more columns of the data table that were previously determined to uniformly split the data table. The method further includes, in response to determining that the data table does not include the at least one column: inserting, with at least one processor, an index column into the data table; and classifying, with at least one processor, the index column as a candidate column for splitting the data table. The method further includes splitting, with at least one processor, the data table based on the candidate column to generate a plurality of subdivisions, wherein a number of the plurality of subdivisions is equal to a number of a plurality of nodes in a server cluster, and wherein the plurality of subdivisions are generated based on subranges of values in a range of values in the candidate column. The method further includes distributing, with at least one processor, each of the plurality of subdivisions to a node of the plurality of nodes of the server cluster so as to cause the server cluster to collectively process the data table.

In some non-limiting embodiments or aspects, the method may further include removing, with at least one processor, the index column from the data table after the data table is split and before the plurality of subdivisions are distributed to the server cluster for processing.

In some non-limiting embodiments or aspects, the method may further include identifying, with at least one processor, an existing column of the data table not previously used to split the data table. The method may further include evaluating, with at least one processor, a uniformity of a split of the data table based on the existing column. The method may further include, in response to determining that the existing column can be used to split the data table uniformly, adding, with at least one processor, the existing column to the set of columns and classifying the existing column as capable of being used to uniformly split the data table.

In some non-limiting embodiments or aspects, splitting the data table based on the candidate column may further include: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

In some non-limiting embodiments or aspects, the method may further include receiving, from a user interface, the identification of the data table in a request to import the data table to the server cluster for processing. The method may further include transmitting, to the user interface, a response indicating that the data table has been imported to the server cluster for processing.

According to some non-limiting embodiments or aspects, provided is a computer program product for reconfiguring a data table for processing on a server cluster. The computer program product includes at least one non-transitory computer-readable medium including program instructions that, when executed by at least one processor, cause the at least one processor to extract a data table from a relational database based on an identification of the data table. The program instructions further cause the at least one processor to determine whether the data table includes at least one column having a range of values with a uniform distribution by identifying a set of columns previously evaluated and used to split data for distributed processing and determining whether the set of columns includes one or more columns of the data table that were previously determined to uniformly split the data table. The program instructions further cause the at least one processor to, in response to determining that the data table includes the at least one column, classify the at least one column as a candidate column for splitting the data table. The program instructions further cause the at least one processor to, in response to determining that the data table does not include the at least one column: insert an index column into the data table; and classify the index column as the candidate column for splitting the data table. The program instructions further cause the at least one processor to split the data table based on the candidate column to generate a plurality of subdivisions of the data table, wherein a number of the plurality of subdivisions is equal to a number of a plurality of nodes in a server cluster, and wherein the plurality of subdivisions are generated based on subranges of values in a range of values in the candidate column. The program instructions further cause the at least one processor to distribute each of the plurality of subdivisions to a node of the plurality of nodes of the server cluster so as to cause the server cluster to collectively process the data table.

In some non-limiting embodiments or aspects, the program instructions may further cause the at least one processor to remove the index column from the data table after the data table is split and before the plurality of subdivisions are distributed to the server cluster for processing.

In some non-limiting embodiments or aspects, the program instructions may further cause the at least one processor to identify an existing column of the data table not previously used to split the data table. The program instructions may further cause the at least one processor to evaluate a uniformity of a split of the data table based on the existing column. The program instructions may further cause the at least one processor to, in response to determining that the existing column can be used to split the data table uniformly, add the existing column to the set of columns and classify the existing column as capable of being used to uniformly split the data table.

In some non-limiting embodiments or aspects, splitting the data table based on the candidate column may further include: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

In some non-limiting embodiments or aspects, the program instructions may further cause the at least one processor to receive, from a user interface, the identification of the data table in a request to import the data table to the server cluster for processing. The program instructions may further cause the at least one processor to transmit, to the user interface, a response indicating that the data table has been imported to the server cluster for processing.

In some non-limiting embodiments or aspects, the program instructions further cause the at least one processor to, in response to determining that the data table includes the at least one column: evaluate a uniformity of a split of the data table based on using the at least one column as the candidate column; and, in response to determining that using the at least one column as the candidate column does not split the data table uniformly, modify the set of columns to classify the at least one column as not able to uniformly split the data table.

Other non-limiting embodiments or aspects will be set forth in the following numbered clauses:

Clause 1: A system comprising a server comprising at least one processor, wherein the server is programmed or configured to: extract a data table from a relational database based on an identification of the data table; determine whether the data table comprises at least one column having a range of values with a uniform distribution by identifying a set of columns previously evaluated and used to split data for distributed processing and determining whether the set of columns comprises one or more columns of the data table that were previously determined to uniformly split the data table; in response to determining that the data table comprises the at least one column, classify the at least one column as a candidate column for splitting the data table; in response to determining that the data table does not comprise the at least one column: insert an index column into the data table; and classify the index column as the candidate column for splitting the data table; split the data table based on the candidate column to generate a plurality of subdivisions of the data table, wherein a number of the plurality of subdivisions is equal to a number of a plurality of nodes in a server cluster, and wherein the plurality of subdivisions are generated based on subranges of values in a range of values in the candidate column; and distribute each of the plurality of subdivisions to a node of the plurality of nodes of the server cluster so as to cause the server cluster to collectively process the data table.

Clause 2: The system of clause 1, wherein the server is further programmed or configured to remove the index column from the data table after the data table is split and before the plurality of subdivisions are distributed to the server cluster for processing.

Clause 3: The system of clause 1 or clause 2, wherein the server is further programmed or configured to: identify an existing column of the data table not previously used to split the data table; evaluate a uniformity of a split of the data table based on the existing column; and, in response to determining that the existing column can be used to split the data table uniformly, add the existing column to the set of columns and classify the existing column as capable of being used to uniformly split the data table.

Clause 4: The system of any of clauses 1-3, wherein splitting the data table based on the candidate column further comprises: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

Clause 5: The system of any of clauses 1-4, wherein the server is further programmed or configured to receive, from a user interface, the identification of the data table in a request to import the data table to the server cluster for processing.

Clause 6: The system of any of clauses 1-5, wherein the server is further programmed or configured to transmit, to the user interface, a response indicating that the data table has been imported to the server cluster for processing.

Clause 7: The system of any of clauses 1-6, wherein the server is further programmed or configured to, in response to determining that the data table comprises the at least one column: evaluate a uniformity of a split of the data table based on using the at least one column as the candidate column; and, in response to determining that using the at least one column as the candidate column does not split the data table uniformly, modify the set of columns to classify the at least one column as not able to uniformly split the data table.

Clause 8: A computer-implemented method comprising: extracting, with at least one processor, a data table from a relational database based on an identification of the data table; determining, with at least one processor, whether the data table comprises at least one column having a range of values with a uniform distribution by identifying a set of columns previously evaluated and used to split data for distributed processing, and determining whether the set of columns comprises one or more columns of the data table that were previously determined to uniformly split the data table; in response to determining that the data table does not comprise the at least one column: inserting, with at least one processor, an index column into the data table; and classifying, with at least one processor, the index column as a candidate column for splitting the data table; splitting, with at least one processor, the data table based on the candidate column to generate a plurality of subdivisions, wherein a number of the plurality of subdivisions is equal to a number of a plurality of nodes in a server cluster, and wherein the plurality of subdivisions are generated based on subranges of values in a range of values in the candidate column; and distributing, with at least one processor, each of the plurality of subdivisions to a node of the plurality of nodes of the server cluster so as to cause the server cluster to collectively process the data table.

Clause 9: The computer-implemented method of clause 8, further comprising removing, with at least one processor, the index column from the data table after the data table is split and before the plurality of subdivisions are distributed to the server cluster for processing.

Clause 10: The computer-implemented method of clause 8 or clause 9, further comprising: identifying, with at least one processor, an existing column of the data table not previously used to split the data table; evaluating, with at least one processor, a uniformity of a split of the data table based on the existing column; and, in response to determining that the existing column can be used to split the data table uniformly, adding, with at least one processor, the existing column to the set of columns and classifying the existing column as capable of being used to uniformly split the data table.

Clause 11: The computer-implemented method of any of clauses 8-10, wherein splitting the data table based on the candidate column further comprises: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

Clause 12: The computer-implemented method of any of clauses 8-11, further comprising receiving, from a user interface, the identification of the data table in a request to import the data table to the server cluster for processing.

Clause 13: The computer-implemented method of any of clauses 8-12, further comprising transmitting, to the user interface, a response indicating that the data table has been imported to the server cluster for processing.

Clause 14: A computer program product comprising at least one non-transitory computer-readable medium including program instructions that, when executed by at least one processor, cause the at least one processor to: extract a data table from a relational database based on an identification of the data table; determine whether the data table comprises at least one column having a range of values with a uniform distribution by identifying a set of columns previously evaluated and used to split data for distributed processing and determining whether the set of columns comprises one or more columns of the data table that were previously determined to uniformly split the data table; in response to determining that the data table comprises the at least one column, classify the at least one column as a candidate column for splitting the data table; in response to determining that the data table does not comprise the at least one column: insert an index column into the data table; and classify the index column as the candidate column for splitting the data table; split the data table based on the candidate column to generate a plurality of subdivisions of the data table, wherein a number of the plurality of subdivisions is equal to a number of a plurality of nodes in a server cluster, and wherein the plurality of subdivisions are generated based on subranges of values in a range of values in the candidate column; and distribute each of the plurality of subdivisions to a node of the plurality of nodes of the server cluster so as to cause the server cluster to collectively process the data table.

Clause 15: The computer program product of clause 14, wherein the program instructions further cause the at least one processor to remove the index column from the data table after the data table is split and before the plurality of subdivisions are distributed to the server cluster for processing.

Clause 16: The computer program product of clause 14 or 15, wherein the program instructions further cause the at least one processor to: identify an existing column of the data table not previously used to split the data table; evaluate a uniformity of a split of the data table based on the existing column; and, in response to determining that the existing column can be used to split the data table uniformly, add the existing column to the set of columns and classify the existing column as capable of being used to uniformly split the data table.

Clause 17: The computer program product of any of clauses 14-16, wherein splitting the data table based on the candidate column further comprises: determining the range of values of the candidate column; subdividing the range of values to produce a plurality of subranges equal in number to the number of the plurality of nodes in the server cluster; sorting the data table in sequential order of the candidate column; and generating each subdivision of the plurality of subdivisions by splitting the data table based on the candidate column and a respective subrange of the plurality of subranges.

Clause 18: The computer program product of any of clauses 14-17, wherein the program instructions further cause the at least one processor to receive, from a user interface, the identification of the data table in a request to import the data table to the server cluster for processing.

Clause 19: The computer program product of any of clauses 14-18, wherein the program instructions further cause the at least one processor to transmit, to the user interface, a response indicating that the data table has been imported to the server cluster for processing.

Clause 20: The computer program product of any of clauses 14-19, wherein the program instructions further cause the at least one processor to, in response to determining that the data table comprises the at least one column: evaluate a uniformity of a split of the data table based on using the at least one column as the candidate column; and, in response to determining that using the at least one column as the candidate column does not split the data table uniformly, modify the set of columns to classify the at least one column as not able to uniformly split the data table.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying figures, in which:

FIG. 8 is a flow diagram of a method for reconfiguring a data table for distributed processing on a server cluster, according to some non-limiting embodiments or aspects.

Figure 1:
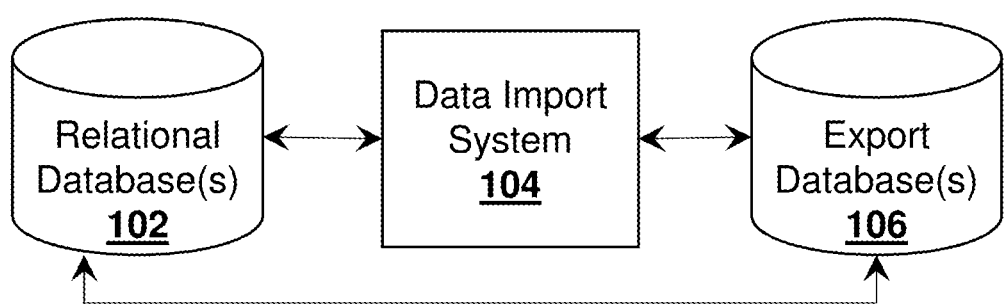
FIG. 1 is a schematic diagram of a system for reconfiguring a data table for distributed processing on a server cluster, according to some non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to some non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

Non-limiting embodiments or aspects of the present disclosure are directed to systems, methods, and computer program products for reconfiguring a data table for distributed processing on a server cluster. In some non-limiting embodiments or aspects, a data import skew resolver system may include a server comprising at least one processor, wherein the server is programmed or configured to: extract a data table from a relational database based on an identification of the data table; determine whether the data table comprises at least one column having a range of values with a uniform distribution by identifying a set of columns previously evaluated and used to split data for distributed processing and determining whether the set of columns comprises one or more columns of the data table that were previously determined to uniformly split the data table; and in response to determining that the data table comprises the at least one column, classify the at least one column as a candidate column for splitting the data table. In some non-limiting embodiments or aspects, in response to determining that the data table does not comprise the at least one column, the at least one server may be programmed or configured to insert an index column into the data table; and classify the index column as the candidate column for splitting the data table. In some non-limiting embodiments or aspects, the at least one server may be programmed or configured to split the data table based on the candidate column to generate a plurality of subdivisions. In some non-limiting embodiments or aspects, a number of the plurality of subdivisions is equal to a number of a plurality of nodes in a server cluster. In some non-limiting embodiments or aspects, the plurality of subdivisions are generated based on subranges of values in a range of values in the candidate column. In some non-limiting embodiments or aspects, the at least one server may be programmed or configured to distribute each of the plurality of subdivisions to a node of the plurality of nodes of the server cluster so as to cause the server cluster to collectively process the data table.

In this way, systems, methods, and/or products described in the present disclosure may improve the performance of processing skewed data tables. The data import skew resolver system overcomes the problem of data skew by evenly dividing the data that is distributed to a server cluster, which improves parallel processing. The system checks for a predetermined column to act as a key by which to split the data across server nodes. If there is no such appropriate column, the system injects a surrogate index column that provides a perfect division of data. In doing these steps, the system creates a more even server load, thereby increasing efficiency. Additionally, creating a more even server load improves the overall processing of the data by reducing the processing time and reducing the amount of computer resources necessary to complete the parallel processing of the data. As such, the overall parallel processing of the data is completed faster.

Referring now to FIG. 1, FIG. 1 depicts a system 100 for reconfiguring a data table for distributed processing on a server cluster, according to some non-limiting embodiments or aspects. The system 100 includes relational database(s) 102, data import system 104, and export database(s) 106.

Relational database(s) 102 may include one or more devices capable of receiving information from and/or communicating information to data import system 104 and/or export database(s) 106. For example, relational database(s) 102 may include a computing device, such as a computer, a server, a group of servers, and/or other like devices. In some non-limiting embodiments or aspects, relational database(s) 102 may be in communication with a data storage device, which may be local or remote to relational database(s) 102. In some non-limiting embodiments or aspects, relational database(s) 102 may be capable of receiving information stored in the data storage device.

Data import system 104 may include one or more devices capable of receiving information from and/or communicating information to relational database(s) 102 and/or export database(s) 106. For example, data import system 104 may include a computing device, such as a computer, a server, a group of servers, and/or other like devices. In some non-limiting embodiments or aspects, data import system 104 may be associated with a financial institution, a transaction service provider, and/or an issuer, as described herein. For example, data import system 104 may be operated by a financial institution, a transaction service provider, and/or an issuer.

Export database(s) 106 may include one or more devices capable of receiving information from and/or communicating information to relational database(s) 102 and/or data import system 104. For example, export database(s) 106 may include a computing device, such as a computer, a server, a group of servers, and/or other like devices. In some non-limiting embodiments or aspects, export database(s) 106 may be in communication with a data storage device, which may be local or remote to export database(s) 106. In some non-limiting embodiments or aspects, export database(s) 106 may be capable of receiving information from, storing information in, communicating information to, or searching information stores in the data storage device. It will be appreciated that relational database 102 and export database 106 may be comprised in a same database system.

In some non-limiting embodiments or aspects, data import system 104 may extract a data table from relational database(s) 102. For example, data import system 104 may extract a data table from relational database(s) 102 based on an identification (e.g., an identifier, a table name, a description of contained data, etc.) of the data table, as described herein. Additionally or alternatively, data import system 104 may determine whether the data table comprises at least one column having a range of values with a uniform distribution, as described herein. For example, data import system 104 may determine whether the data table comprises at least one column having a range of values with a uniform distribution by identifying a set of columns previously evaluated (e.g., by the data import system 104) and used to split data for distributed processing and determining whether the set of columns comprises one or more columns of the data table that were previously determined to uniformly split the data table, as described herein. For example, the set of columns may include a set of records of tested columns and a classification of the test columns as being previously capable or incapable of generating a uniform (e.g., even) split of the data table. Additionally or alternatively, in response to determining that the data table comprises the at least one column, data import system 104 may classify the at least one column as a candidate column for splitting the data table, as described herein. Additionally or alternatively, in response to determining that the data table does not comprise the at least one column, data import system 104 may insert an index column into the data table, as described herein. Additionally or alternatively, data import system 104 may classify the index column as the candidate column for splitting the data table, as described herein. Additionally or alternatively, data import system 104 may split the data table based on the candidate column to generate a plurality of subdivisions, as described herein. A number of the plurality of subdivisions may be equal to a number of a plurality of nodes in a server cluster. The plurality of subdivisions may be generated based on subranges of values in a range of values in the candidate column. Additionally or alternatively, data import system 104 may distribute each of the plurality of subdivisions to a node of the plurality of nodes of the server cluster so as to cause the server cluster to collectively process the data table, as described herein.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of system 100 may perform one or more functions described as being performed by another set of devices of system 100.

Figure 2:
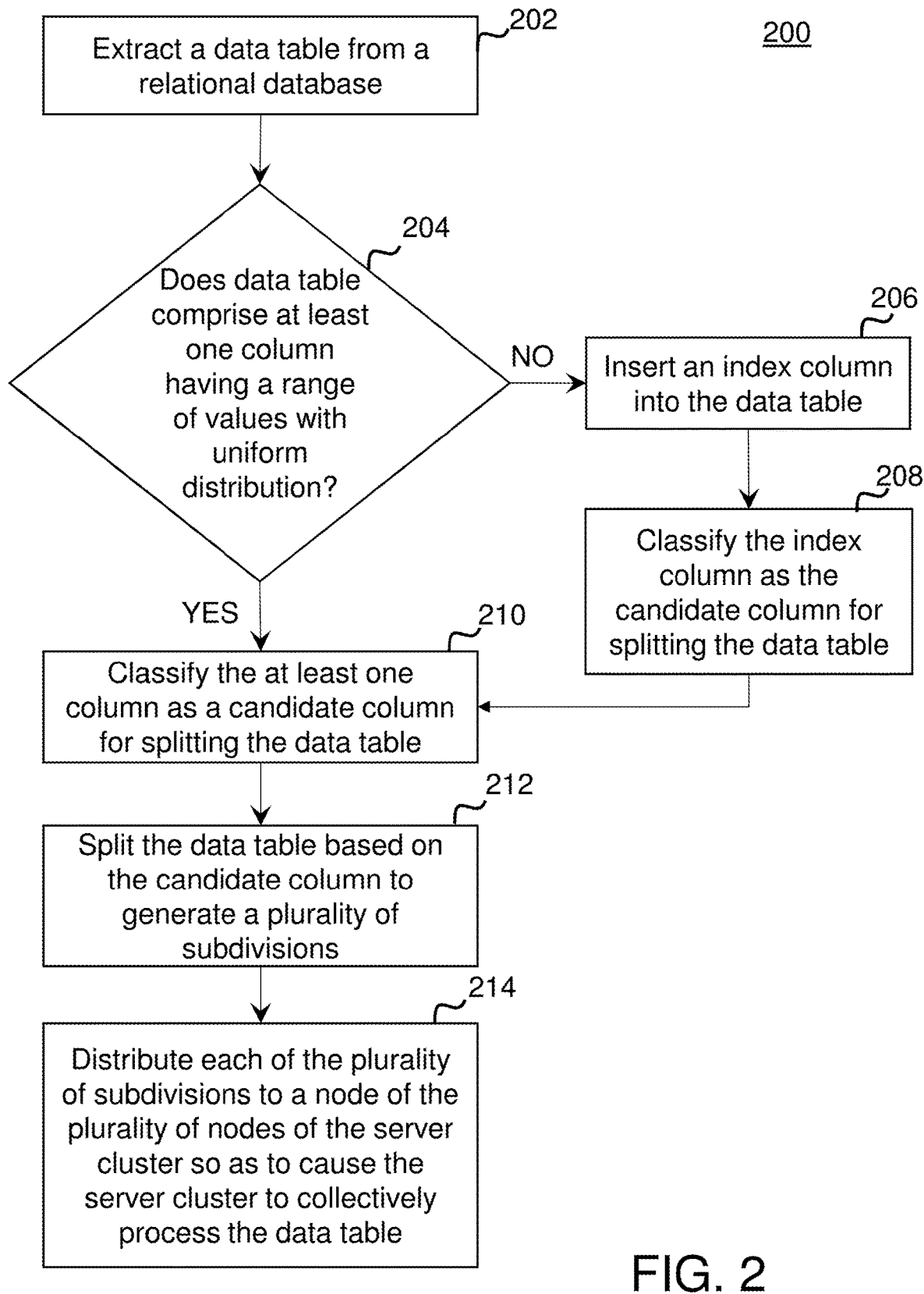
FIG. 2 is a flow diagram of a method for reconfiguring a data table for distributed processing on a server cluster, according to some non-limiting embodiments or aspects.

Referring now to FIG. 2, shown is a process 200 for reconfiguring a data table for distributed processing on a server cluster, according to some non-limiting embodiments or aspects. The steps shown in FIG. 2 are for example purposes only. It will be appreciated that additional, fewer, different, and/or a different order of steps may be used in non-limiting embodiments or aspects. Furthermore, two or more steps shown in FIG. 2 may be implemented within a single step, or a single step shown in FIG. 2 may be implemented as multiple steps. In some non-limiting embodiments or aspects, one or more of the steps of process 200 may be performed (e.g., completely, partially, etc.) by data import system 104 (e.g., one or more devices of data import system 104). In some non-limiting embodiments or aspects, one or more of the steps of process 200 may be performed (e.g., completely, partially, etc.) by another device or group of devices separate from or including data import system 104, such as relational database(s) 102 and/or export database(s) 106.

As shown in FIG. 2, at step 202, process 200 may include extracting a data table from a relational database. For example, data import system 104 may extract a data table from relational database(s) 102 based on an identification of the data table.

As shown in FIG. 2, at step 204, process 200 may include determining whether the data table comprises at least one column having a range of values with a uniform distribution. For example, data import system 104 may determine whether the data table comprises at least one column having a range of values with a uniform distribution by identifying a set of columns previously evaluated and used to split data for distributed processing and determining whether the set of columns comprises one or more columns of the data table that were previously determined to uniformly split the data table. If, at step 204, data import system 104 determines that the data table does not comprise at least one column having a range of values with uniform distribution, the process will continue to step 206. Additionally or alternatively, if, at step 204, data import system 104 determines that the data table comprises at least one column having a range of values with uniform distribution, the process will continue to step 210.

As shown in FIG. 2, at step 206, process 200 may include inserting an index column (e.g., a column of sequential numbers, such as 1, 2, 3, etc., for each subsequent record) into the data table. For example, data import system 104 may insert an index column into the data table.

As shown in FIG. 2, at step 208, process 200 may include classifying the index column as the candidate column for splitting the data table. For example, data import system 104 may classify the index column as the candidate column for splitting the data table.

As shown in FIG. 2, at step 210, process 200 may include splitting the data table based on the candidate column to generate a plurality of subdivisions. For example, data import system 104 may split the data table based on the candidate column to generate a plurality of subdivisions. In some non-limiting embodiments or aspects, the number of the plurality of subdivisions may be equal to a number of a plurality of nodes in a server cluster. In some non-limiting embodiments or aspects, the plurality of subdivisions may be generated based on subranges of values in a range of values in the candidate column.

As shown in FIG. 2, at step 214, process 200 may include distributing each of the plurality of subdivisions to a node of the plurality of nodes of the server cluster so as to cause the server cluster to collectively process the data table. For example, data import system 104 may distribute each of the plurality of subdivisions to a node (e.g., each subdivision to a different node) of the plurality of nodes of the server cluster so as to cause the server cluster to collectively process the data table.

Figure 3:
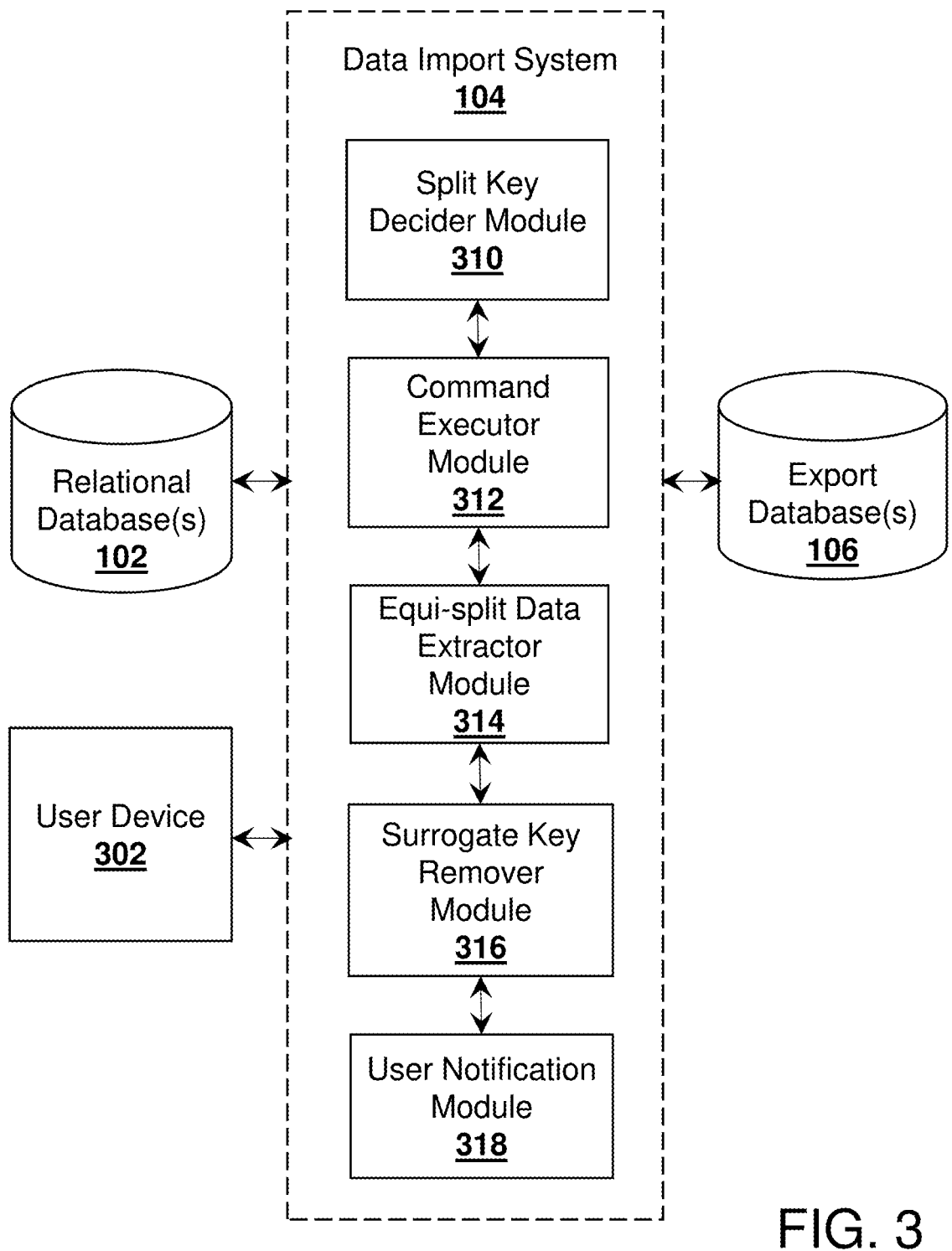
FIG. 3 is a schematic and process-flow diagram of a system and method for reconfiguring a data table for distributed processing on a server cluster, according to some non-limiting embodiments or aspects.

Referring now to FIG. 3, shown is an exemplary diagram 300 of non-limiting embodiments or aspects of the process in FIG. 2. As shown in FIG. 3, exemplary diagram 300 may include user device 302, data import system 104, relational database(s) 102, export database(s) 106, split key decider module 310, command executor module 312, equi-split data extractor module 314, surrogate key remover module 316, and user notification module 318.

As shown in FIG. 3, data import system 104 may include a number of processor functionalities, which may be stored and executed on a same or different computing device. The processor functionalities may include a split key decider module 310, command executor module 312, equi-split data module 314, surrogate key remover module 316, and/or user notification module 318. In some non-limiting embodiments or aspects, data import system 104 may receive information from and/or communicate information to user device 302, relational database(s) 102, and/or export database(s) 106.

For illustrative purposes, user device 302 may communicate with data import system 104 (e.g., transmit data to and receive data from the data import system 104). For example, user device 302 may communicate an identification of a data table to data import system 104, such as in a request for processing a data table. Data import system 104 may extract a data table from relational database(s) 102 based on the identification of the data table received from user device 302. In some non-limiting embodiments or aspects, split key decider module 310 may determine whether the data table comprises at least one column having a range of values with a uniform distribution. For example, split key decider module 310 may determine whether the data table comprises at least one column having a range of values with a uniform distribution by identifying a set of columns previously evaluated and used to split data for distributed processing and determining whether the set of columns comprises one or more columns of the data table that were previously determined to uniformly split the data table. In some non-limiting embodiments or aspects, in response to determining that the data table comprises the at least one column, split key decider module 310 may classify the at least one column as a candidate column for splitting the data table. Additionally or alternatively, in response to determining that the data table does not comprise the at least one column, split key decider module 310 may insert an index column into the data table and classify the index column as the candidate column for splitting the data table. In some non-limiting embodiments or aspects, command executor module 312 may split the data table. For example, command executor module 312 may split the data table based on the candidate column to generate a plurality of subdivisions. In some non-limiting embodiments or aspects, a number of the plurality of subdivisions may be equal to a number of a plurality of nodes in a server cluster. In some non-limiting embodiment or aspects, the plurality of subdivisions may be generated based on subranges of values in a range of values in the candidate column. In some non-limiting embodiments or aspects, equi-split data extractor module 314 may distribute each of the plurality of subdivisions to a node of the plurality of nodes of the server cluster so as to cause the server cluster to collectively process the data table.

In some non-limiting embodiments or aspects, in a case where split key decider module 310 determines that the data table does not comprise at least one column having a range of values with uniform distribution and inserts an index column into the data table, surrogate key remover module 316 may remove the index column from the data table.

In some non-limiting embodiments or aspects, data import system 104 may communicate data to export database(s) 106. For example, data import system 104 may send the resulting data table to export database(s) 106. In some non-limiting embodiments or aspects, user notification module 318 may notify a user (e.g., in a response to the original request) when the resulting data table is received by export database(s) 106. For example, user notification module 318 may send a communication to user device 302 indicating that the resulting data table has been sent from data import system 104 to export database(s) 106. The communication may also notify the user that the data table will be, is being, and/or has been processed on the server cluster.

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of exemplary diagram 300 may perform one or more functions described as being performed by another set of systems or another set of devices of diagram 300.

Figure 4:
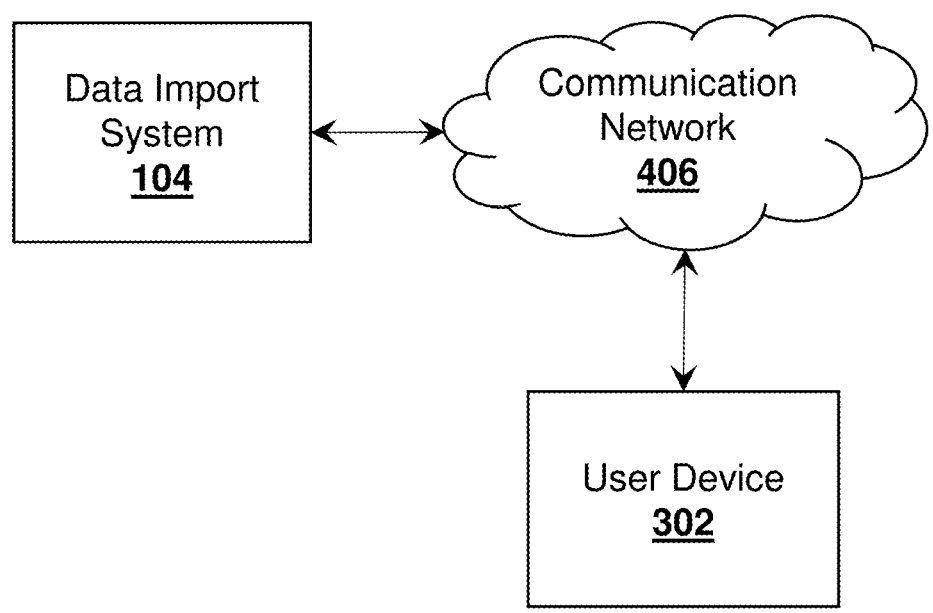
FIG. 4 is a diagram of some non-limiting embodiments or aspects of an environment in which systems, devices, products, apparatus, and/or methods, described herein, may be implemented, according to the principles of the present disclosure.

Referring now to FIG. 4, shown is a diagram of non-limiting embodiments or aspects of an environment in which methods, systems, and/or computer program products, described herein, may be implemented according to the principles of the presently disclosed subject matter. As shown in FIG. 4, environment 400 includes data import system 104, user device 302, and communication network 406.

Data import system 104 may include one or more devices capable of receiving information from and/or communicating information to user device 302 via communication network 406. In some non-limiting embodiments or aspects, data import system 104 may be associated with a transaction service provider as described herein. In some non-limiting embodiments or aspects, data import system 104 may be in communication with a data storage device, which may be local or remote to data import system 104. In some non-limiting embodiments or aspects, data import system 104 may be capable of receiving information from, storing information in, communicating information to, or searching information stored in the data storage device.

User device 302 may include one or more devices capable of receiving information from and/or communicating information to data import system 104 via communication network 406. Additionally or alternatively, each user device 302 may include a device capable of receiving information from and/or communicating information to other user devices 302 via communication network 406, another network (e.g., an ad hoc network, a local network, a private network, a virtual private network, and/or the like), and/or any other suitable communication technique. For example, user device 302 may include a client device and/or the like. In some non-limiting embodiments or aspects, user device 302 may or may not be capable of receiving information (e.g., from another user device 302) via a short-range wireless communication connection (e.g., an NFC communication connection, an RFID communication connection, a Bluetooth® communication connection, a Zigbee® communication connection, and/or the like), and/or communicating information (e.g., to another user device 302) via a short-range wireless communication connection.

Communication network 406 may include one or more wired and/or wireless networks. For example, communication network 406 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 4 are provided as an example. There may be additional systems, devices, and/or networks; fewer systems, devices, and/or networks; different systems, devices, and/or networks; and/or differently arranged systems, devices, and/or networks than those shown in FIG. 4. Furthermore, two or more systems or devices shown in FIG. 4 may be implemented within a single system or device, or a single system or device shown in FIG. 4 may be implemented as multiple, distributed systems or devices. Additionally or alternatively, a set of systems (e.g., one or more systems) or a set of devices (e.g., one or more devices) of environment 400 may perform one or more functions described as being performed by another set of systems or another set of devices of environment 400.

Figure 5:
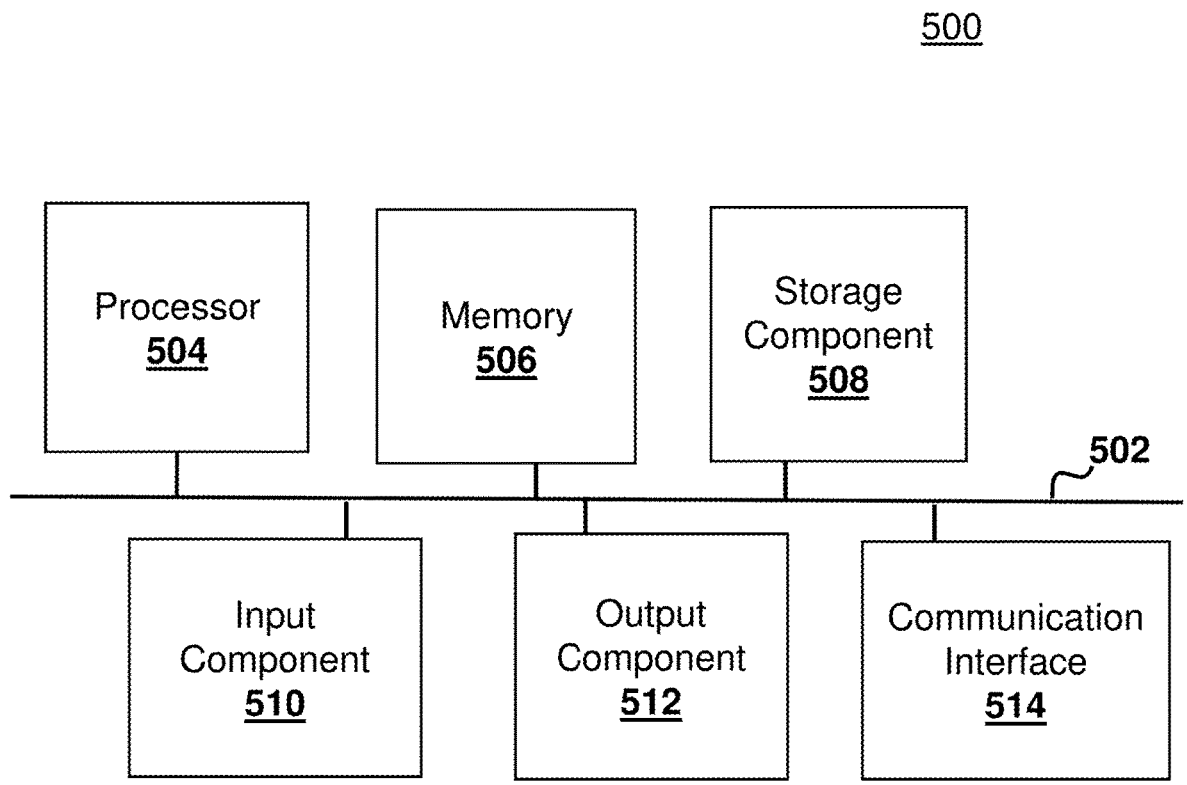
FIG. 5 illustrates example components of a device for use in connection with non-limiting embodiments or aspects.

Referring now to FIG. 5, shown is a diagram of example components of a device 500, according to some non-limiting embodiments or aspects. Device 500 may correspond to relational database(s) 102, data import system 104, export database(s) 106, user device 302, and/or communication network 406, as an example. In some non-limiting embodiments or aspects, such systems or devices may include at least one device 500 and/or at least one component of device 500. The number and arrangement of components shown are provided as an example. In some non-limiting embodiments or aspects, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

As shown in FIG. 5, device 500 may include bus 502, processor 504, memory 506, storage component 508, input component 510, output component 512, and communication interface 514. Bus 502 may include a component that permits communication among the components of device 500. In some non-limiting embodiments or aspects, processor 504 may be implemented in hardware, software, or a combination of hardware and software. For example, processor 504 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 506 may include random access memory (RAM), read only memory (ROM), and/or another type of dynamic or static storage device (e.g., flash memory, magnetic memory, optical memory, etc.) that stores information and/or instructions for use by processor 504.

With continued reference to FIG. 5, storage component 508 may store information and/or software related to the operation and use of device 500. For example, storage component 508 may include a hard disk (e.g., a magnetic disk, an optical disk, a magneto-optic disk, a solid state disk, etc.) and/or another type of computer-readable medium. Input component 510 may include a component that permits device 500 to receive information, such as via user input (e.g., a touch screen display, a keyboard, a keypad, a mouse, a button, a switch, a microphone, etc.). Additionally, or alternatively, input component 510 may include a sensor for sensing information (e.g., a global positioning system (GPS) component, an accelerometer, a gyroscope, an actuator, etc.). Output component 512 may include a component that provides output information from device 500 (e.g., a display, a speaker, one or more light-emitting diodes (LEDs), etc.). Communication interface 514 may include a transceiver-like component (e.g., a transceiver, a separate receiver and transmitter, etc.) that enables device 500 to communicate with other devices, such as via a wired connection, a wireless connection, or a combination of wired and wireless connections. Communication interface 514 may permit device 500 to receive information from another device and/or provide information to another device. For example, communication interface 514 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 500 may perform one or more processes described herein. Device 500 may perform these processes based on processor 504 executing software instructions stored by a computer-readable medium, such as memory 506 and/or storage component 508. A computer-readable medium may include any non-transitory memory device. A memory device includes memory space located inside of a single physical storage device or memory space spread across multiple physical storage devices. Software instructions may be read into memory 506 and/or storage component 508 from another computer-readable medium or from another device via communication interface 514. When executed, software instructions stored in memory 506 and/or storage component 508 may cause processor 504 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "programmed or configured," as used herein, refers to an arrangement of software, hardware circuitry, or any combination thereof on one or more devices.

Figure 6:
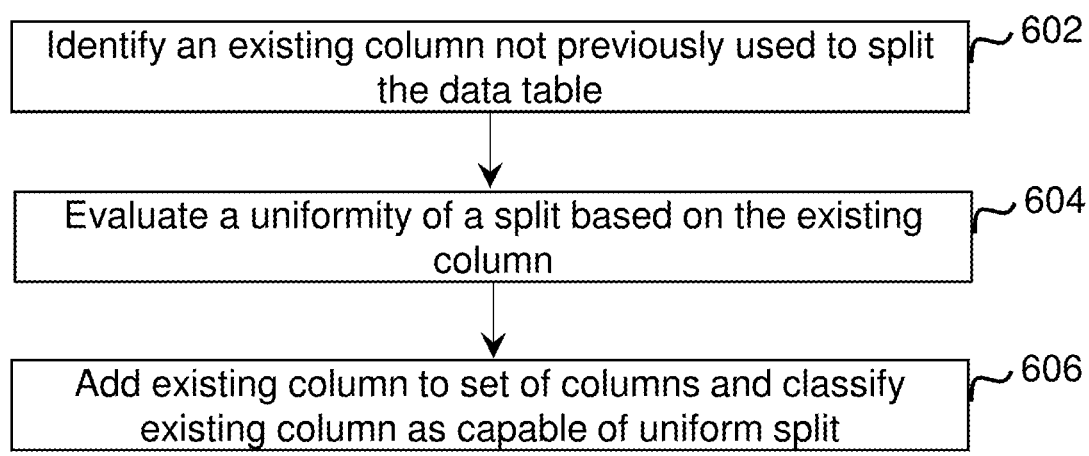
FIG. 6 is a flow diagram of a method for reconfiguring a data table for distributed processing on a server cluster, according to some non-limiting embodiments or aspects.

Referring now to FIG. 6, provided is a method 600 for reconfiguring a data table for processing on a server cluster, according to some non-limiting embodiments or aspects of the present disclosure. One or more steps of the method 600 may be executed by the data import system 104 and/or another computing device. A step in method 600 executed by one computing device (e.g., of the data import system 104) may be executed by a same or different computing device as another step in method 600.

In step 602, an existing column of the data table not previously used to split the data table may be identified. For example, data import system 104 may evaluate the columns of the data table and determine an existing column of the data table that was not previously used to split the data table, e.g., by determining an existing column in the data table that is not in the set of columns previously evaluated.

In step 604, a uniformity of a split based on the existing column may be determined. For example, data import system 104 may evaluate a uniformity (e.g., evenness) of a split of the data table based on the existing column that was not previously used to split the data table, e.g., by proceeding with the steps of splitting the data table into a plurality of subdivisions based on the existing column. The method described in FIG. 7 may be employed to evaluate the uniformity of the split of the data table based on the existing column that was not previously used to split the data table.

In step 606, the existing column may be added to the set of columns that were previously evaluated and may be classified as a column capable of uniformly (e.g., evenly) splitting the data table. For example, in response to determining that the existing column can be used to split the data table uniformly (in step 604), data import system 104 may add the existing column to the set of columns that were previously evaluated. Data import system 104 may further classify the existing column as capable of being used to uniformly split the data table. If the existing column was determined not to uniformly split the data table, the existing column may still be added to the set of columns by the data import system, but the existing column may be classified as not capable of being used to uniformly split the data table.

Figure 7:
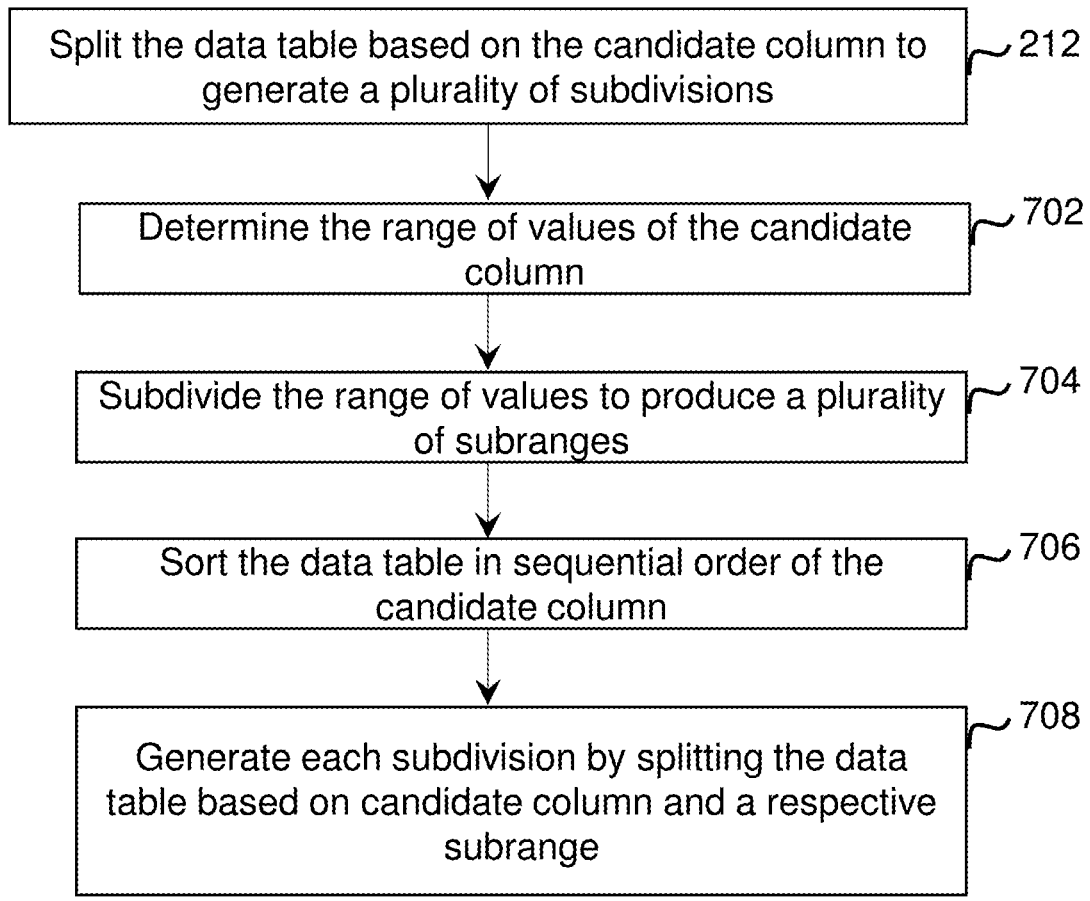
FIG. 7 is a flow diagram of a method for reconfiguring a data table for distributed processing on a server cluster, according to some non-limiting embodiments or aspects.

Referring now to FIG. 7, provided is a method 700 for reconfiguring a data table for processing on a server cluster, according to some non-limiting embodiments or aspects of the present disclosure. One or more steps of the method 700 may be executed by data import system 104 and/or another computing device. A step in method 700 executed by one computing device (e.g., of data import system 104) may be executed by a same or different computing device as another step in method 700.

In step 212, the data table may be split based on the candidate column. For example, data import system 104 may split the data table based on the candidate column to generate a plurality of subdivisions of the data table, wherein a number of the plurality of subdivisions is equal to a number of a plurality of nodes in a server cluster, and wherein the plurality of subdivisions are generated based on subranges of values in a range of values in the candidate column. Steps 702-708 may further define the splitting of step 212

In step 702, the range of values of the candidate column may be determined. For example, data import system 104 may determine the range of values of the candidate column. Determining the range of values may include determining a minimum value of the candidate column by identifying a record with a lowest value of a parameter of the candidate column, determining a maximum value of the candidate column by identifying a record with the highest value of the parameter of the candidate column, and setting the range as being between the minimum value and the maximum value, inclusively. By way of further example, for a candidate column that has a minimum value of 1 and a maximum value of 10,000, the range of values may be said to be 1 to 10,000.

In step 704, the range of values may be subdivided to produce a plurality of subranges. For example, data import system 104 may subdivide the range of values to produce a plurality of subranges equal in number to the number of the plurality of nodes in the server cluster. By way of further example, if there are 10 nodes in the server cluster, and the range of the candidate column was previously determined to be 1 to 10,000, then the plurality of subranges may include: 1 to 1,000; 1,001 to 2,000; 2,001 to 3,000; 3,001 to 4,000; 4,001 to 5,000; 5,001 to 6,000; 6,001 to 7,000; 7,001 to 8,000; 8,001 to 9,000; and 9,001 to 10,000.

In step 706, the data table may be sequentially ordered based on the candidate column. For example, data import system 104 may sort the data table in sequential order of the candidate column. By way of further example, the records of the data table may be sorted (e.g., rearranged) such that the record having the minimum value of the parameter of the candidate column is at the top of the data table, the record having the maximum value of the parameter of the candidate column is at the bottom of the data table, and all the other records are arranged in order of their value of the parameter of the candidate column.

In step 708, each subdivision of the plurality of subdivisions may be generated by splitting the data table based on the candidate column and a respective subrange. For example, data import system 104 may generate each subdivision of the plurality of subdivisions by splitting the data table based on the candidate column and a respective subrange of the plurality of subranges. By way of further example, a first number of records (e.g., about 1,000 records) may have candidate column values that fall in the first subrange (e.g., 1 to 1,000). This first number of records may be set to the first subdivision. A second number of records (e.g., about 1,000 records) may have candidate column values that fall in the second subrange (e.g., 1,001 to 2,000). This second number of records may be set to the second subdivision. It will be appreciated that all subdivisions may be generated in this manner, such as by assigning records or generating splits in the table where record values correspond to the plurality of subranges.

Referring now to FIG. 8, provided is a method 800 for reconfiguring a data table for processing on a server cluster, according to some non-limiting embodiments or aspects of the present disclosure. One or more steps of method 800 may be executed by data import system 104 and/or another computing device. A step in method 800 executed by one computing device (e.g., of data import system 104) may be executed by a same or different computing device as another step in method 800.

In step 802, an identification of the data table may be received in a request. For example, data import system 104 may receive, from a user interface (e.g., of a user device 302), the identification of the data table in a request to import the data table to the server cluster for processing. The request may include additional parameters of how the data table is to be processed on the server cluster, such as an identifier of one or more machine-learning models for evaluating the data table, a number/identification of server nodes to process the data table, and/or the like. Based on the identification received from the user interface, data import system 104 may proceed to extract the data table from a relational database, as shown in step 202 of FIG. 2, and proceed as described therein.

After executing method 200 of FIG. 2, a response may be transmitted (in step 804) that indicates that the data table has been imported to the server cluster for processing. For example, data import system 104 may, in response to receiving the identification of the data table in step 802 and after executing method 200 of FIG. 2, transmit, to the user interface, a response indicating that the data table has been imported to the server cluster for processing. The response may further include the data including results of the processing, and/or may provide additional options for the user to control the processing of the data table on the server cluster.

Although embodiments and aspects have been described in detail for the purpose of illustration, it is to be understood that such detail is solely for that purpose and that the disclosure is not limited to the disclosed embodiments and aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising a server comprising at least one processor, wherein the at least one processor is programmed or configured to:
   extract a data table from a relational database based on an identification of the data table, the data table comprising a plurality of records;
   determine whether the data table comprises at least one column having a range of values with a uniform distribution, wherein, when determining whether the data table comprises at least one column having a range of values with a uniform distribution, the at least one processor is programmed or configured to:
   identify a set of columns previously used to split the data table for distributed processing;
   determine whether the set of columns comprises one or more columns of the data table that were previously determined to uniformly split the data table; and
   determine that the data table comprises the at least one column having the range of values with the uniform distribution based on determining that the set of columns comprises the one or more columns of the data table that were previously determined to uniformly split the data table;
   in response to determining that the data table comprises the at least one column having the range of values with the uniform distribution, classify the at least one column as a candidate column for splitting the data table;
   in response to determining that the data table does not comprise the at least one column:
   insert an index column into the data table, the index column comprising a column of sequential numbers for each record of the plurality of records; and
   classify the index column as the candidate column for splitting the data table;
   split the data table uniformly based on the candidate column to generate a plurality of uniform subdivisions of the data table, wherein a number of uniform subdivisions of the plurality of uniform subdivisions of the data table is equal to a number of nodes of a plurality of nodes in a server cluster, and wherein the plurality of uniform subdivisions of the data table are generated based on subranges of values in a range of values in the candidate column, wherein, when splitting the data table, the at least one processor is programmed or configured to:
   determine the range of values of the candidate column;
   subdivide the range of values of the candidate column to produce a plurality of subranges of values of the candidate column equal in number to the number of the plurality of nodes in the server cluster;
   sort the data table in sequential order of the candidate column; and
   generate each uniform subdivision of the plurality of uniform subdivisions of the data table, wherein, when generating each uniform subdivision of the plurality of uniform subdivisions of the data table, the at least one processor is programmed or configured to:
   split the data table into the plurality of uniform subdivisions of the data table based on the plurality of subranges of values of the candidate column; and
   distribute each uniform subdivision of the plurality of uniform subdivisions of the data table to a node of the plurality of nodes of the server cluster so as to cause the server cluster to collectively process the data table.

2. The system of claim 1, wherein the at least one processor is further programmed or configured to remove the index column from the data table after the data table is split and before the plurality of uniform subdivisions of the data table are distributed to the server cluster for processing.

3. The system of claim 1, wherein the at least one processor is further programmed or configured to:
   identify an existing column of the data table not previously used to split the data table;
   evaluate a uniformity of a split of the data table based on the existing column; and
   in response to determining that the existing column can be used to split the data table uniformly, add the existing column to the set of columns and classify the existing column as capable of being used to uniformly split the data table.

4. The system of claim 1, wherein the at least one processor is further programmed or configured to receive, from a user interface, the identification of the data table in a request to import the data table to the server cluster for processing.

5. The system of claim 4, wherein the at least one processor is further programmed or configured to transmit, to the user interface, a response indicating that the data table has been imported to the server cluster for processing.

6. The system of claim 1, wherein the at least one processor is further programmed or configured to, in response to determining that the data table comprises the at least one column:
evaluate a uniformity of a split of the data table based on using the at least one column as the candidate column; and
in response to determining that using the at least one column as the candidate column does not split the data table uniformly, modify the set of columns to classify the at least one column as not able to uniformly split the data table.

7. A computer-implemented method comprising:
extracting, with at least one processor, a data table from a relational database based on an identification of the data table, the data table comprising a plurality of records;
determining, with at least one processor, whether the data table comprises at least one column having a range of values with a uniform distribution, wherein determining whether the data table comprises at least one column having a range of values with a uniform distribution comprises:
identifying a set of columns previously used to split the data table for distributed processing;
determining whether the set of columns comprises one or more columns of the data table that were previously determined to uniformly split the data table; and
determining that the data table comprises the at least one column having the range of values with the uniform distribution based on determining that the set of columns comprises the one or more columns of the data table that were previously determined to uniformly split the data table;
in response to determining that the data table does not comprise the at least one column:
inserting, with at least one processor, an index column into the data table, the index column comprising a column of sequential numbers for each record of the plurality of records; and
classifying, with at least one processor, the index column as a candidate column for splitting the data table;
splitting, with at least one processor, the data table uniformly based on the candidate column to generate a plurality of uniform subdivisions of the data table, wherein a number of uniform subdivisions of the plurality of uniform subdivisions of the data table is equal to a number of nodes of a plurality of nodes in a server cluster, and wherein the plurality uniform of subdivisions are generated based on subranges of values in a range of values in the candidate column, wherein splitting the data table comprises:
determining the range of values of the candidate column;
subdividing the range of values of the candidate column to produce a plurality of subranges of values of the candidate column equal in number to the number of the plurality of nodes in the server cluster;
sorting the data table in sequential order of the candidate column; and
generating each uniform subdivision of the plurality of uniform subdivisions of the data table, wherein generating each uniform subdivision of the plurality of uniform subdivisions of the data table comprises:
splitting the data table into the plurality of uniform subdivisions of the data table based on the plurality of subranges of values of the candidate column; and
distributing, with at least one processor, each uniform subdivision of the plurality of uniform subdivisions of the data table to a node of the plurality of nodes of the server cluster so as to cause the server cluster to collectively process the data table.

8. The computer-implemented method of claim 7, further comprising removing, with at least one processor, the index column from the data table after the data table is split and before the plurality of uniform subdivisions of the data table are distributed to the server cluster for processing.

9. The computer-implemented method of claim 7, further comprising:
identifying, with at least one processor, an existing column of the data table not previously used to split the data table;
evaluating, with at least one processor, a uniformity of a split of the data table based on the existing column; and
in response to determining that the existing column can be used to split the data table uniformly, adding, with at least one processor, the existing column to the set of columns and classifying the existing column as capable of being used to uniformly split the data table.

10. The computer-implemented method of claim 7, further comprising receiving, from a user interface, the identification of the data table in a request to import the data table to the server cluster for processing.

11. The computer-implemented method of claim 10, further comprising transmitting, to the user interface, a response indicating that the data table has been imported to the server cluster for processing.

12. A computer program product comprising at least one non-transitory computer-readable medium including program instructions that, when executed by at least one processor, cause the at least one processor to:
extract a data table from a relational database based on an identification of the data table, the data table comprising a plurality of records;
determine whether the data table comprises at least one column having a range of values with a uniform distribution, wherein, the program instructions that cause the at least one processor to determine whether the data table comprises at least one column having a range of values with a uniform distribution, cause the at least one processor to:
identify a set of columns previously used to split the data table for distributed processing;
determine whether the set of columns comprises one or more columns of the data table that were previously determined to uniformly split the data table; and
determine that the data table comprises the at least one column having the range of values with the uniform distribution based on determining that the set of columns comprises the one or more columns of the data table that were previously determined to uniformly split the data table;

in response to determining that the data table comprises the at least one column having a range of values with a uniform distribution, classify the at least one column as a candidate column for splitting the data table;

in response to determining that the data table does not comprise the at least one column:
- insert an index column into the data table, the index column comprising a column of sequential numbers for each record of the plurality of records; and
- classify the index column as the candidate column for splitting the data table;

split the data table uniformly based on the candidate column to generate a plurality of uniform subdivisions of the data table, wherein a number of uniform subdivisions of the plurality of uniform subdivisions of the data table is equal to a number of nodes of a plurality of nodes in a server cluster, and wherein the plurality of uniform subdivisions of the data table are generated based on subranges of values in a range of values in the candidate column, wherein, the program instructions that cause the at least one processor to split the data table, cause the at least one processor to:
- determine the range of values of the candidate column;
- subdivide the range of values of the candidate column to produce a plurality of subranges of values of the candidate column equal in number to the number of the plurality of nodes in the server cluster;
- sort the data table in sequential order of the candidate column; and
- generate each uniform subdivision of the data table of the plurality of uniform subdivisions of the data table, wherein, the program instructions that cause the at least one processor to generate each uniform subdivision of the plurality of uniform subdivisions of the data table, cause the at least one processor to:
  - split the data table into the plurality of uniform subdivisions of the data t able based on the plurality of subranges of values of the candidate column; and distribute each uniform subdivision of the plurality of uniform subdivisions of the data table to a node of the plurality of nodes of the server cluster so as to cause the server cluster to collectively process the data table.

13. The computer program product of claim 12, wherein the program instructions further cause the at least one processor to remove the index column from the data table after the data table is split and before the plurality of uniform subdivisions of the data table are distributed to the server cluster for processing.

14. The computer program product of claim 12, wherein the program instructions further cause the at least one processor to:
- identify an existing column of the data table not previously used to split the data table;
- evaluate a uniformity of a split of the data table based on the existing column; and
- in response to determining that the existing column can be used to split the data table uniformly, add the existing column to the set of columns and classify the existing column as capable of being used to uniformly split the data table.

15. The computer program product of claim 12, wherein the program instructions further cause the at least one processor to receive, from a user interface, the identification of the data table in a request to import the data table to the server cluster for processing.

16. The computer program product of claim 15, wherein the program instructions further cause the at least one processor to transmit, to the user interface, a response indicating that the data table has been imported to the server cluster for processing.

17. The computer program product of claim 12, wherein the program instructions further cause the at least one processor to, in response to determining that the data table comprises the at least one column:
- evaluate a uniformity of a split of the data table based on using the at least one column as the candidate column; and
- in response to determining that using the at least one column as the candidate column does not split the data table uniformly, modify the set of columns to classify the at least one column as not able to uniformly split the data table.

* * * * *